N. C. BEMENT.
TRANSMISSION MECHANISM AND DIFFERENTIAL GEARING.
APPLICATION FILED NOV. 15, 1920.
1,409,994.
Patented Mar. 21, 1922.
4 SHEETS—SHEET 4.
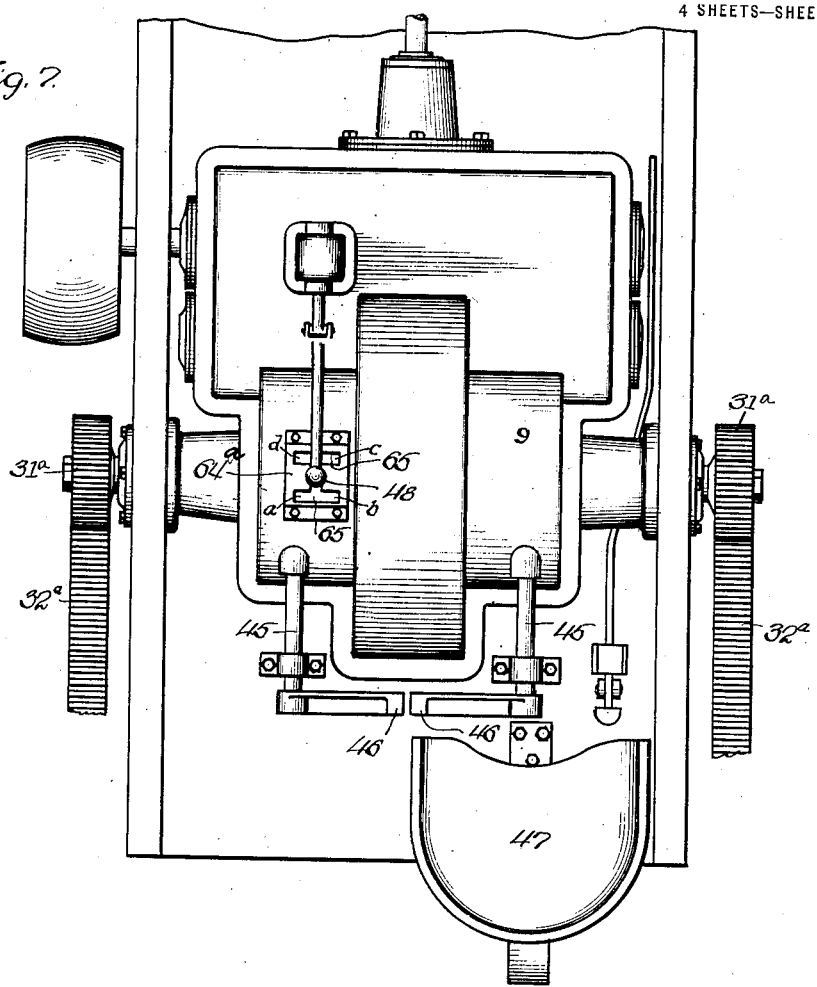
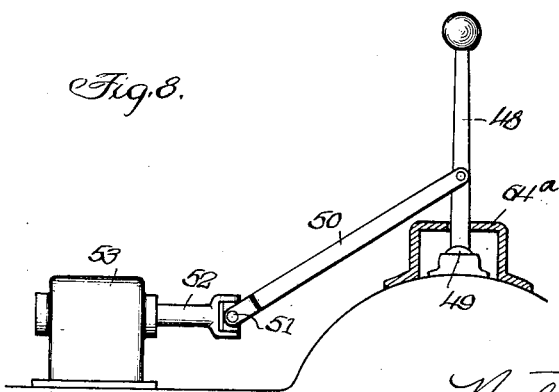

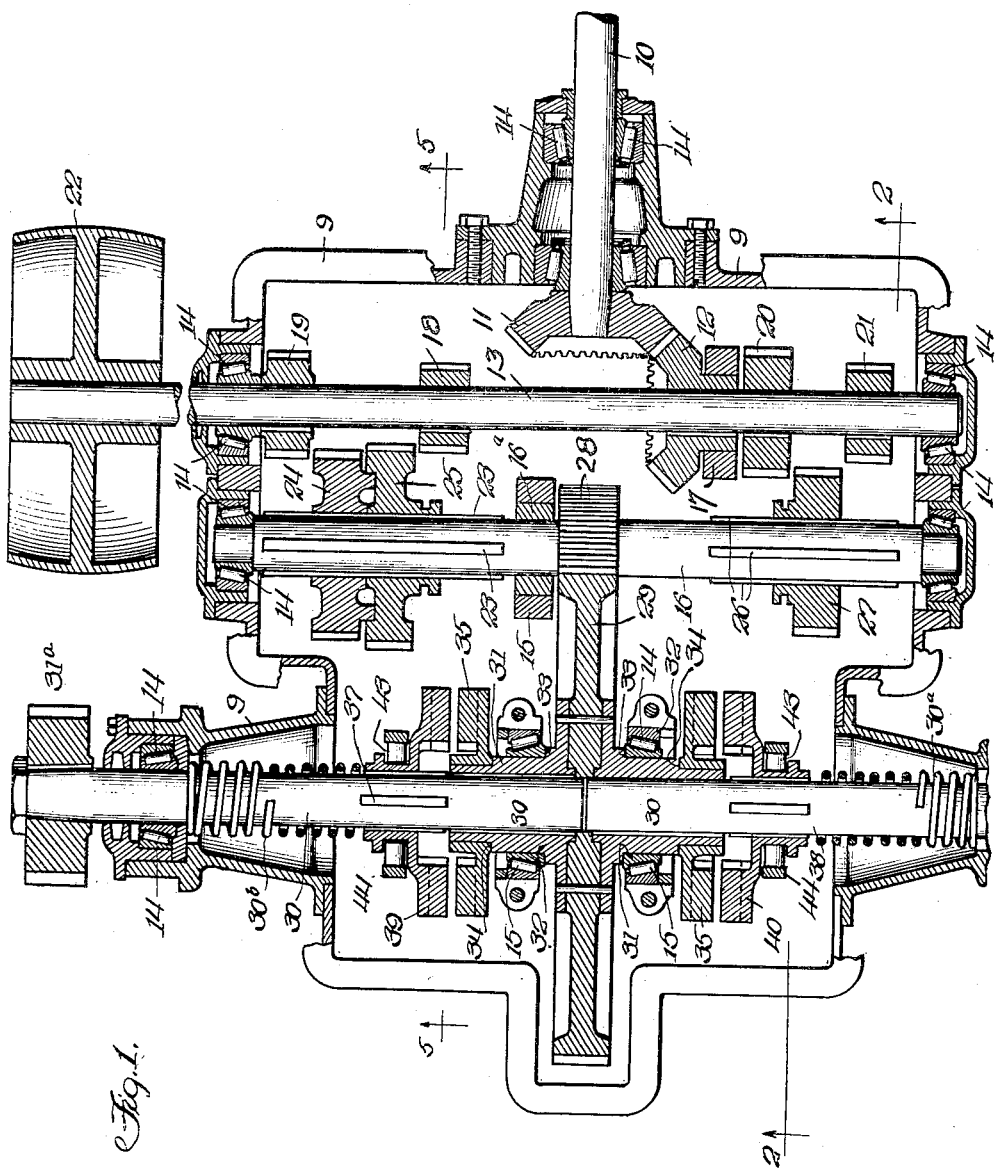

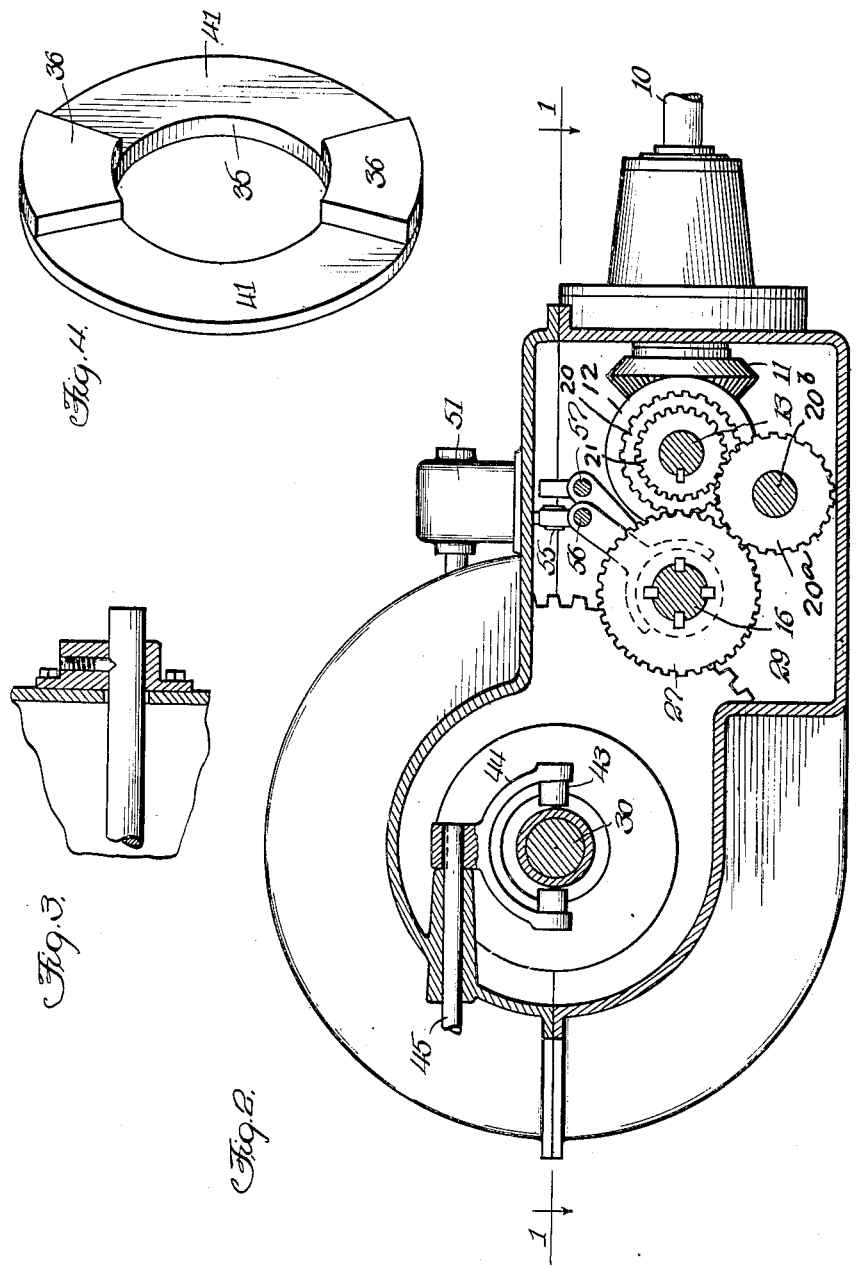

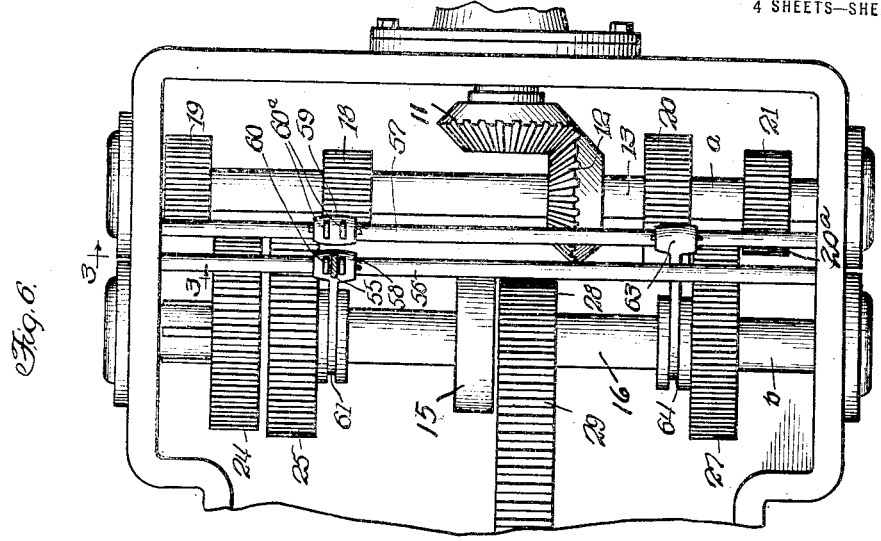
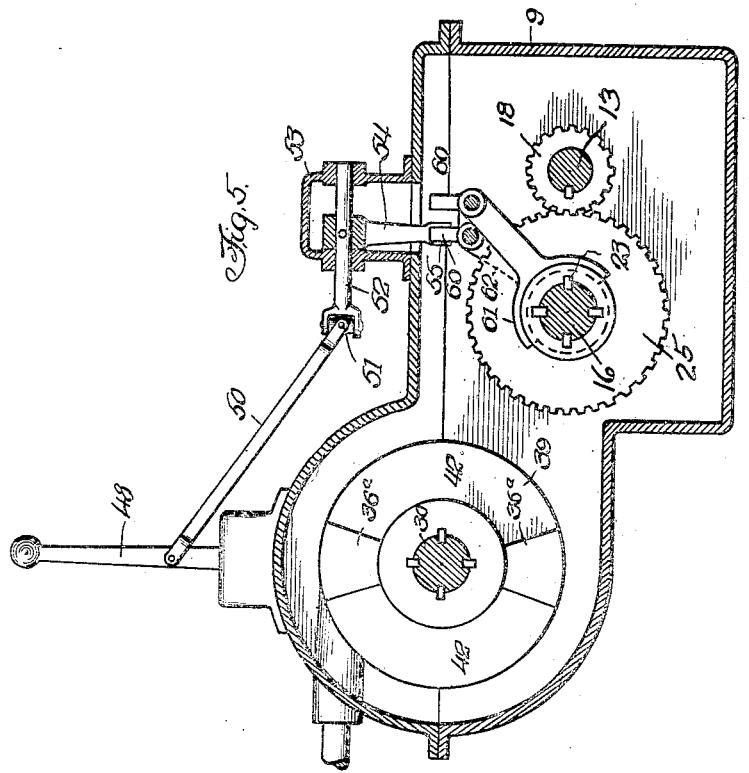

ically designed for use on motor vehicles, of the kind used in connection with agricultural vehicles such as tractors, although I do not wish to be understood as limiting my invention to such use of the mechanism I will hereinafter describe.
UNITED STATES PATENT OFFICE.

NAHUM C. BEMENT, OF ROCKFORD, ILLINOIS.

TRANSMISSION MECHANISM AND DIFFERENTIAL GEARING.

1,409,994.  Specification of Letters Patent.  Patented Mar. 21, 1922.

Application filed November 15, 1920. Serial No. 424,044.

*To all whom it may concern:*

Be it known that I, NAHUM C. BEMENT, a citizen of the United States, residing at Rockford, Winnebago County, Illinois, have invented certain new and useful Improvements in Transmission Mechanism and Differential Gearing, of which the following, taken in connection with the drawings, is a description.

My invention relates to differential gearing and transmission mechanism of the single unit type more particularly designed for use on motor vehicles, of the kind used in connection with agricultural vehicles such as tractors, although I do not wish to be understood as limiting my invention to such use of the mechanism I will hereinafter describe.

One of the objects of my invention is to provide a differential which will impart a positive drive to both wheels, and also permit, when necessary, one wheel to travel faster than the other which is required when the machine is turning a corner. My invention will operate in such instances by disconnecting one wheel which becomes dead in its action and will rotate forward or backward while the power is all directed to the wheel on the opposite end of the axle, thereby permitting the machine to turn in a small space.

It is also an object of my invention to provide a transmission-differential mechanism particularly suitable for tractors, which will enable the tractor to turn a corner with the action on the front wheels and one rear wheel which will enable the machine to turn in a smaller space than is possible with machines of this class as heretofore constructed.

A further object of my invention is to provide mechanism whereby the driven shaft of the transmission becomes the driving shaft of the differential, and by means of which action may be transmitted to the differential by a much more simplified construction of mechanism than has heretofore been the case on machines of this class, and at the same time maintain a machine with high mechanical efficiency. In this construction the differential is normally locked on its two shafts so that both wheels operate in unison, and as needed either of said shafts may be unlocked, thus rendering either one of the two shafts the driving shaft as required by the work being done.

It is also an object of my invention to provide a differential with machanism automatically locking the two shafts in operative position and with means for disengaging either one of them as desired. As the two shafts are normally locked in operation there is sufficient independent action to permit the tractor to turn a short curve in the road or in the field without disengaging either shaft.

By automatically operated mechanism the differential is returned to normal position whenever it becomes necessary to operate the clutch mechanism on either shaft.

With the above and other objects in view, this invention consists in the novel combination and arrangement of parts hereinafter more fully described and illustrated in the accompanying drawings, it being understood of course that certain changes may be made with respect to size, proportion and minor details without departing from the spirit of or sacrificing any of the advantages of my invention. In these drawings I have illustrated what I now consider an embodiment of the essential features of my invention in which:

Figure 1 is a longitudinal sectional view taken through the transmission mechanism and differential as assembled in the machine, Figure 2 is a vertical sectional view taken on line 2, 2, of Figure 1, Figure 3 is a sectional detail of the shifting clutch taken on line 3, 3, of Figure 6, Figure 4 is a perspective view of one of the clutch members, Figure 5 is a vertical sectional view taken on line 5, 5, of Figure 1, Figure 6 is a plan view of the transmission with the parts shown in Figure 1, Figure 7 is a top plan view of the invention as applied to a tractor, and, Figure 8 is a detail of the lever operating the shifting mechanism.

Referring to the drawings and particularly to Figure 1 thereof, it will be understood that the mechanism is mounted within a suitable housing 9 which supports the bearings in which the operative parts of the mechanism are mounted, and that the shaft 10 has connection with and is rotated by the engine. As the engine forms no part of the present invention no illustration has been made of the same and no further reference thereto will be required in this description.

A beveled gear 11 is carried by and rotated with the shaft 10. This gear transmits motion to a corresponding beveled gear 12 which is mounted upon what I shall term the driving shaft 13, which shaft is mounted in suitable bearings in the housing 9. The gears 11, 12 are the only beveled gears in my construction. All of the other gearing utilized in my present invention is what may be termed the spur gear type, all having teeth whose positions are parallel with the axis of the wheel.

In providing suitable bearings for all the shafts in this construction, I have utilized what are known in the market as the Bearings, 14, these being best suited for the purpose. and bearings 15, for each of the driving shafts. No separate description of these bearings will be given as they form no part of my invention.

In my present invention the shaft 13 is the transmission or driving shaft of the tractor; through suitable clutch mechanism hereinafter described operative connection is effected and motion is transmitted from said shaft 13 to shaft 16 extending parallel therewith; in the transmission the shaft 16 is the driven shaft, and this in turn becomes the driving shaft for the differential to be hereinafter explained.

Supported in suitable bearings 17 is the bevel gear 12 carried on the driving shaft 13, which is mounted in operative relation with the bevel gear 11. Also mounted on the shaft 13 are the speed gears, 18, 19, 20 and 21; the gear 18 representing first speed, the gear 19 second speed, the gear 20 road speed, and the gear 21 reverse. The shaft 16 is mounted in suitable end bearings supported in the housing 9 and also has a central bearing 16$^a$.

Upon the outer end of this shaft 13 is a crown pulley 22, on which a belt may be placed to drive any other mechanism such as a saw, grinder, cutter or the like used in connection with regular farm work.

23 are feather keys sunk into grooves formed in the face of the shaft 16, and by means of which the right and left slidable clutch members, 24, 25, are keyed to the shaft and adapted by mechanism to be hereafter explained to be brought into operative relation with the speed gears 18 or 19. On the opposite end of this shaft 16 are the feather keys 26 sunk into corresponding grooves formed in the face of the shaft 16, and on which is mounted the slidable clutch member 27. This clutch member 27 is adapted by mechanism, to be presently explained, to be moved into operative relation with either the speed gear 20 or the reverse idler 20$^a$, shown in Fig. 2.

A pinion 28 is mounted upon the shaft 16 at approximately the center thereof, which in operation drives the spur gear 29 of the differential.

30, 30 represent a divided shaft, on which is mounted the differential gearing. This shaft is mounted in suitable end bearings in the housing 9 and on the outer ends thereof supports the bull pinions 31$^a$ which in turn mesh with the bull gears 32$^a$, 32$^a$, through which motion is transmitted to the drive wheels (not here shown) of the tractor.

As will be observed in Figure 1, the hub of the gear 29 is provided upon each side thereof with circumferential shoulders 33, 34, of different diameters. The bearings 31, 32 fit against the shoulders 33, 34. Carried by said hub and seated against the shoulders 34 on the hub are clutch members, 35, 35. These clutch members are rigidly attached to and rotate with the gear 29.

Each of the clutch members 35 takes the form of a disk or ring fitted on the shaft as heretofore described; on one side of said disk or ring are oppositely facing clutch blocks, 36, 36, formed integrally with or fixedly attached to said clutch ring 35 (see Figure 4).

Feather keys 37, 38 are sunk into grooves on the shaft 30 opposite the clutch rings 35, 35. Keyed to said shaft and slidable thereon are the clutch disks or rings, 39, 40. One face of each of these clutch rings carries clutch blocks 36$^a$, 36$^a$, corresponding to the blocks 36, 36, shown in Figure 4. These clutch members 39, 40 are mounted in position on the shaft 30 to bring the clutch blocks 36$^a$ thereon opposite the recesses 41, 41 between the blocks 36, 36 on the oppositely facing clutch member 35 when it is desired to lock said members into operative engagement. The blocks 36, 36 on the clutch member 35 fit into corresponding recesses 42, 42, between the blocks 36$^a$, 36$^a$, on the inner face of the clutch members 39, 40.

43, 43 are locking pins or projections carried by the claws 44, which in turn have fixed connection with the operating levers 45, 45. These pins or projections 43 fit into recesses in the hubs of the clutch rings 39, 40, whereby positive engagement is effected therewith.

The levers 45, 45, extend to the foot treadles 46, 46, which are located within convenient reach of the operator stationed at the seat 47 (Figure 7).

Supported on the divided shaft 30 between the outer bearings and the clutch members 39, 40 are the coiled springs 30$^a$, 30$^b$, by means of which said clutch members are normally held in operative relation with the members 35 mounted on said shaft 30 when in operation.

Mounted upon the housing 9 is a clutch actuating lever, 48, supported in a ball and socket bearing 49. Pivotally connected to said lever 48 is an arm 50 extending to a universal joint connection 51 on the shaft 52.

This shaft 52 is supported in suitable bearings formed in the housing 53. Fixedly secured to said shaft and extending downwardly is an arm 54 having on the ends thereof a blade 55.

Extending parallel with the shafts 13 and 16 and positioned above the plane of said shafts are the clutch shafts 56, 57. Keyed to said shafts 56, 57 are the clutch operating members 58, 59, each of which has a pair of fixed jaws 60, 60$^a$, between which the blade 55 operates to actuate the clutch members on the speed gears 18, 19, 20 and 21.

Formed integrally with or fixedly secured to the clutch operating members 58, 59 is a claw 61; this claw has locking engagement with the clutch member 24. Fixedly mounted also on the shaft 57 at the opposite end thereof is a clutch operating member 63 having a claw 64, which engages with the clutch member 27, keyed to the shaft 16, in position to be brought into operative relation with the speed gear 20, and the reverse idler 20$^a$ by operation of the lever 48.

Referring now to Figure 7, the lower end of the clutch operating lever, 48, extends through the guide or supporting member 64$^a$. This guide member 64$^a$ is riveted or otherwise secured to the housing 9 of the differential. On the top of said guide member, 64$^a$, is a slot 65, formed in the shape of the letter H, into the different ends of which the clutch operating lever 48 is manipulated to direct the mechanism in different operations.

The clutch operating lever, 48 is movable into and out of the four ends $a$, $b$, $c$, $d$ of the slot 65, to bring a clutch into engagement with either the first, second, or third speed gears 18, 19, 20 or reverse idler 20$^a$. When the machine is out of operation the lever 48 will be in neutral or central position as shown in Figure 7 when the clutch members will be inactive.

When the operator desires to start the machine he moves the operating lever 48 into the end $a$ of the recess, which motion will, through the connecting members heretofore described, bring the clutch member 25 on shaft 16 into engagement with the gear 18, mounted on the driving shaft 13; when second speed is desired the operator moves the lever 48 into the slot $b$, the action of which will shift the clutch 25 on the shaft 16 into contact with the clutch member 24 which will engage the second speed gear 19 on the shaft 13.

When road speed is desired the operator withdraws the lever from slot $b$, pushes it forward through the connecting slot $z$, and which action has released the blade 55 formerly positioned between the jaws 60, and moves said blade to a position of engagement between the jaws 60$^a$, then moves the lever into the slot $c$, the effect of which is to move the clutch member 27 into engagement with the gear 20, the highest speed gear on the machine.

When it is desired to reverse, the operator moves the lever from the slot $c$ into the slot $d$, the action of which has placed the clutch member 27 into engagement with the reverse idler 20$^a$.

When it is desired to disconnect the transmission from the engine the operating lever 48 is drawn to central position as shown in Figure 7, when all of the clutch mechanisms are idle.

To disconnect one of the rear wheels from the differential the operator depresses its corresponding foot pedal 46, which through its connections will disengage the clutch member, 39 or 40, allowing the drive wheel on the outer end of the shaft 30 to receive all the power, the inner wheel being loose on the shaft will rotate in either direction or stand still, which permits the machine to be turned on a very short curve. Upon release of the foot pedal 46 the spring, 30$^a$ or 30$^b$, will return the clutch to normal position.

It will be understood that by the manipulation of either of these clutch members, the operation of the differential may be controlled on any speed of the machine, the speed controlled mechanism all being operated by the lever 48 through the clutch members mounted on the shaft 16 being brought into engagement with the gears 18, 19, 20, mounted on the driving shaft 13, and reverse idler 20$^a$ mounted on shaft 20$^b$, the idler driving the gear 21 when the machine is to be reversed.

In Figure 1, I have shown the clutch mechanisms on the differential out of engagement, but in operation said clutch members are normally held in engagement by the springs 30$^a$ or 30$^b$ and are brought to the position shown in Figure 1 by depression of the foot pedals 46, 46, having connection with the clutch member.

When the different parts of the transmission mechanism are in the relative positions shown in Figure 1, only the shaft 13 will be operated which would be the case if a belt were attached to the pulley 22 for driving another mechanism.

When the clutch mechanism upon shaft 16 is brought into engagement with either of the speed gears on shaft 13, motion is transmitted through the pinion 28 and spur gear 29 to the differential which operates either one or both of the rear driving wheels of the machine.

I claim:

1. In a mechanism of the class described, the combination of driving and transmission mechanism, with a differential comprising a divided shaft, a spur gear mounted thereon, clutch disk members mounted on the hub of said gear, said disks having spaced apart block members on one face thereof, co-acting clutch disk members mounted on the aforesaid divided shaft, said last named clutches having spaced apart block members on one face thereof, the block members of the oppositely facing disks adapted to enter recesses between the block members on the corresponding disks, said block members arranged to permit a partial revolution of the shaft to bring the abutting blocks into engagement to provide a positive lock without friction.

2. In a mechanism of the class described, the combination of driving and transmission mechanism with a differential comprising a divided shaft, a spur gear mounted thereon, clutch disks mounted on the hub of said gear, said disks having spaced apart block members on one face thereof, coacting clutch disks mounted on the aforesaid divided shaft, said last named clutches having spaced apart block members on one face thereof, the block members on the oppositely facing disks entering corresponding recesses when in engagement, the spaced apart arrangement of said blocks permitting a partial revolution of the shaft to bring abutting blocks into engagement without friction, and means for operating either of said clutch members independently of the other.

3. In a mechanism of the class described, the combination of driving and transmission mechanism with a differential comprising a divided shaft, a spur gear mounted thereon, clutch members fixedly secured to the hub of said gear and clutch members slidably mounted on said divided shaft, blocks carried by said clutch members, the blocks on one clutch entering recesses between the blocks on the corresponding clutch, said blocks being spaced apart to permit a partial revolution of the disks to bring said blocks into positive engagement without friction, means for releasing said clutches from engagement simultaneously or indepently of each other, and spring mechanism automatically returning said clutches into engagement.

In testimony whereof I have signed this specification.

NAHUM C. BEMENT.